(12) United States Patent
Yengulalp et al.

(10) Patent No.: US 9,081,616 B2
(45) Date of Patent: Jul. 14, 2015

(54) SYSTEM AND METHOD FOR ADJUSTING A NUMBER OF PROCESSING MODULES BASED ON PROCESSING LOAD

(75) Inventors: Serhan Yengulalp, Lawrence, KS (US); Steve R. Kinney, Prairie Village, KS (US); Brian G. Anderson, Overland Park, KS (US); Scott T.R. Coons, Lawrence, KS (US); David E. Kelley, Olathe, KS (US); Humayun H. Khan, Overland Park, KS (US)

(73) Assignee: Lexmark International Technology, SA (CH)

( * ) Notice: Subject to any disclaimer, the term of this patent is extended or adjusted under 35 U.S.C. 154(b) by 837 days.

(21) Appl. No.: 12/475,045

(22) Filed: May 29, 2009

(65) Prior Publication Data

US 2010/0306779 A1 Dec. 2, 2010

(51) Int. Cl.
G06F 9/30 (2006.01)
G06F 9/50 (2006.01)

(52) U.S. Cl.
CPC .................................. G06F 9/5038 (2013.01)

(58) Field of Classification Search
None
See application file for complete search history.

(56) References Cited

U.S. PATENT DOCUMENTS

| | | | |
|---|---|---|---|
| 5,109,515 A | 4/1992 | Laggis et al. | |
| 6,005,860 A | 12/1999 | Anderson et al. | |
| 6,243,736 B1 | 6/2001 | Diepstraten et al. | |
| 6,298,370 B1 | 10/2001 | Tang et al. | |
| 6,332,163 B1 | 12/2001 | Bowman-Amuah | |
| 6,334,114 B1 | 12/2001 | Jacobs et al. | |
| 6,463,346 B1 * | 10/2002 | Flockhart et al. | 700/102 |
| 6,505,229 B1 | 1/2003 | Turner et al. | |
| 6,507,877 B1 | 1/2003 | Ross | |
| 6,647,419 B1 | 11/2003 | Mogul | |
| 6,792,506 B2 | 9/2004 | Solomon et al. | |
| 6,798,743 B1 | 9/2004 | Ma et al. | |
| 6,865,643 B2 | 3/2005 | Baxter, III | |
| 7,010,596 B2 | 3/2006 | Bantz et al. | |
| 7,013,303 B2 | 3/2006 | Faybishenko et al. | |
| 7,093,004 B2 | 8/2006 | Bernardin et al. | |
| 7,131,125 B2 | 10/2006 | Modelski et al. | |
| 7,150,021 B1 | 12/2006 | Vajjhala et al. | |
| 7,209,979 B2 | 4/2007 | Solomon et al. | |
| 7,219,347 B1 | 5/2007 | Waddington | |
| 7,280,548 B2 | 10/2007 | Sampath et al. | |
| 7,313,560 B2 | 12/2007 | Dilley, Jr. et al. | |
| 7,315,978 B2 | 1/2008 | Giles | |
| 7,337,241 B2 | 2/2008 | Boucher et al. | |
| 7,437,727 B2 | 10/2008 | Leong et al. | |
| 8,275,715 B2 | 9/2012 | Caruso et al. | |
| 2002/0083173 A1 | 6/2002 | Musoll et al. | |
| 2002/0107962 A1 | 8/2002 | Richter et al. | |
| 2002/0133593 A1 | 9/2002 | Johnson et al. | |

(Continued)

OTHER PUBLICATIONS

International Search Report dated Aug. 4, 2010 regarding PCT/US2010/36299, 12 pages.

Primary Examiner — William B Partridge (57) ABSTRACT

Systems and methods improve the equitable distribution the processing capacity of a computing device processing work items retrieved from multiple queues in a workflow system. A retrieval priority is determined for each of the plurality of queues and work items are retrieved from each of the multiple queues according to the retrieval priority. The retrieved work items are then stored in a central data structure. Multiple processing components process the work items stored in the central data structure. The number of processing components is selectively adjusted to maximize efficiency.

34 Claims, 7 Drawing Sheets

(56) References Cited

U.S. PATENT DOCUMENTS

| | | |
|---|---|---|
| 2002/0174227 A1 | 11/2002 | Hartsell et al. |
| 2003/0149685 A1* | 8/2003 | Trossman et al. .......... 707/2 |
| 2003/0191795 A1 | 10/2003 | Bernardin et al. |
| 2003/0236919 A1 | 12/2003 | Johnson et al. |
| 2004/0030745 A1 | 2/2004 | Boucher et al. |
| 2004/0111430 A1 | 6/2004 | Hertling et al. |
| 2004/0205110 A1 | 10/2004 | Hinshaw |
| 2005/0075964 A1 | 4/2005 | Quinn et al. |
| 2005/0223025 A1 | 10/2005 | Bennett, Jr. |
| 2005/0240745 A1 | 10/2005 | Iyer et al. |
| 2006/0085412 A1 | 4/2006 | Johnson et al. |
| 2006/0123010 A1 | 6/2006 | Landry et al. |
| 2006/0136923 A1 | 6/2006 | Kahn et al. |
| 2006/0195508 A1 | 8/2006 | Bernardin et al. |
| 2006/0242313 A1 | 10/2006 | Le et al. |
| 2007/0013948 A1 | 1/2007 | Bevan |
| 2007/0195778 A1 | 8/2007 | Tatar et al. |
| 2008/0071779 A1 | 3/2008 | Mammen et al. |
| 2008/0117913 A1 | 5/2008 | Tatar et al. |
| 2008/0247407 A1 | 10/2008 | Westphal et al. |

* cited by examiner

SYSTEM AND METHOD FOR ADJUSTING A NUMBER OF PROCESSING MODULES BASED ON PROCESSING LOAD

RELATED APPLICATIONS

This application relates to co-pending U.S. non-provisional patent application Ser. No. 12/475,081 titled, "Workflow Management System and Method," filed contemporaneously herewith and assigned to the assignee of the present application.

FEDERALLY SPONSORED RESEARCH OR DEVELOPMENT

Not Applicable.

COMPACT DISK APPENDIX

Not Applicable.

BACKGROUND

Workflow is the automation or computer modeling of a business process, in whole or in part, during which documents, information, or tasks are passed from one activity to another to collectively realize a business objective or policy goal. A work item and corresponding action defines a logical step within the business process or workflow. The work item corresponds to the life cycle, or state, of a body of work as it passes through a workflow. Actions are performed on the work items via a computing or processing device to pass the work item from one state to another in the workflow.

Workflow management systems are computing systems that provide functionality for managing the processing of work items within a workflow. In conventional workflow management systems, work items associated with a particular workflow may be stored in one or more queues. For example, each queue may be a database or other data structure that stores work items that are associated with a particular action to be performed during the workflow. Once a work item is placed in a queue, it remains there until the workflow management system processes or changes the state of the work item. The workflow management system can automatically process work items in the queue or a user using the workflow management system can initiate the processing of work items in the queue.

Some workflow management systems use a single processing thread or module to de-queue or process work items in each queue. Such workflow management systems are limited to processing work items from one queue at a time. Moreover, such systems will often process all of the work items in one queue before processing the work items in a next queue. However, because some queues may store more work items than others, queues with fewer work items will not receive equitable processing time. For example, assume queue A includes 100,000 work items and queue B includes 2,500 work items as compared to queue B. As a result, if queue A is processed first, the completion of actions associated with the work items in queue B may be delayed, and, thus the associated business process can lose valuable processing time.

Workflow management systems employing multiple processing threads to de- queue or process work items from multiple queues assign a different processing threads to each of the queues. Each processing thread can perform a limited number of operations in a set amount of time. The limited number of operations that can be performed by the processing thread is also referred to as processing capacity. Because some queues may store fewer work items than others, a processing thread that is assigned to a queue with fewer work items may expend less processing time than another processing thread that is assigned to a queue with more work items. As a result, some processing threads may operate at minimal processing capacity while other processing threads operate at or near maximum processing capacity.

SUMMARY

According to one aspect, a system processes work items in a workflow. The system includes a plurality of queues and each queue includes a plurality of work items. A processor determines a retrieval priority for each of the plurality of queues. The processor retrieves at least one work item from each of the plurality of queues according to the retrieval priority. The processor stores the at least one work item retrieved from each of the plurality of queues in a workflow data structure and processes the work items stored in the workflow data structure. The processor also selectively adjusts an amount of processing capacity for processing the work items stored in the workflow data structure According to another aspect, a workflow application processes work items in a workflow. The workflow application includes modules that are executable by a processor. A queue storage module receives a plurality of work items from a remote computer and stores each of the plurality of work items in one of a plurality of queues based on a state of each work item in the workflow. A queue selection module determines a retrieval priority for each of the plurality of queues. The queue selection module retrieves at least one work item from each of the plurality of queues according to the retrieval priority for storage in a workflow data structure. An adaptive processing module selectively adjusts a number of processing modules for processing work items stored in the workflow data structure.

According to another aspect, a system processes work items in a workflow. The system includes a plurality of queues and each queue includes a plurality of work items. A computing device includes a workflow application. The workflow application includes modules that are executable by the computing device and configured to process the plurality of work items. A queue selection module determines a retrieval priority for each of the plurality of queues. The queue selection module retrieves at least one work item from each of the plurality of queues according to the retrieval priority for storage in a workflow data structure. An adaptive processing module selectively adjusts a number of processing modules for processing work items stored in the workflow data structure.

According to another aspect, a system processes work items in a workflow. The system includes a workflow data structure each comprising at plurality of work items. The system also includes a computing device that includes a workflow application. The workflow application includes modules that are executable by the computing device. Multiple processing modules are each configured to process work items stored in the workflow data structure. An adaptive processing module selectively adjusts a number of the plurality of processing modules.

According to another aspect, a method is provided for processing a plurality of work items in a workflow at a processor. The method includes receiving a plurality of work items at the processor. The method also includes storing each of the plurality of work items in one of a plurality of queues based on a state of each work item in the workflow. The method also includes determining a retrieval priority for each of the plurality of queues at the processor. The method also includes retrieving at least one work item from each of the plurality of queues according to the retrieval priority for storage in a workflow data structure. The method also includes selectively adjusting an amount of processing capacity of the processor for processing the work items stored in the workflow data structure.

According to another aspect, a system processes work items in a workflow. The system includes a plurality of queues and each queue includes a plurality of work items. A memory stores a plurality of business process definitions. Each business process definition identifies a plurality of states of the work items in the workflow that correspond to a different business process. A processor determines a retrieval priority for each of the plurality of queues. according to the retrieval priority. The processor also stores the at least one work item The processor also retrieves at least one work item from each of the plurality of queues retrieved from each of the plurality of queues in a workflow data structure. The processor also processes the work items stored in the workflow data structure at an initial number of processing modules. The processor also monitors an actual processing load required to process the work items. The processor also retrieves threshold load level data from the memory. The processor also compares the actual processing load to the threshold load level data. The processor increases the initial number of processing modules to a higher number when the actual processing load is greater than the threshold load level data. The processor decreases the initial number of processing modules to a lower number when the actual processing load is less than the threshold load level data.

According to another aspect, a workflow application processes work items in a workflow. The workflow application includes modules that are executable by a processor. A queue storage module receives a plurality of work items from a remote computer and stores each of the plurality of work items in one of a plurality of queues based on a state of each work item in the workflow. A queue selection module determines a retrieval priority for each of the plurality of queues and retrieves at least one work item from each of the plurality of queues according to the retrieval priority for storage in a workflow data structure. A set of processing modules processes the work items stored in the workflow data structure. An initial number of the processing modules are used to process the work items. An adaptive processing module retrieves threshold load level data from a memory, monitors an actual processing load required to process the work items, and compares the actual processing load to the threshold load level data. The adaptive processing module increases the initial number of processing modules to a higher number when the actual processing load is greater than the threshold load level data. The adaptive processing module decreases the initial number of processing modules to a lower number when the actual processing load is less than the threshold load level data.

According to another aspect, a system processes work items in a workflow. The system includes a plurality of queues and each queue includes a plurality of work items. A computing device includes a workflow application that includes modules executable by the computing device and configured to process a plurality of work items in a workflow. A queue selection module determines a retrieval priority for each of the plurality of queues and retrieves at least one work item from each of the plurality of queues according to the retrieval priority for storage in a workflow data structure. A set of processing modules processes the work items stored in the workflow data structure. An initial number of the processing modules are used to process the work items. An adaptive processing module retrieves threshold load level data from a memory, monitors an actual processing load required to process the work items, and compares the actual processing load to the threshold load level data. The adaptive processing module increases the initial number of processing modules to a higher number when the actual processing load is greater than the threshold load level data. The adaptive processing module decreases the initial number of processing modules to a lower number when the actual processing load is less than the threshold load level data.

According to another aspect, a method is provided for processing a plurality of work items in a workflow at a processor. The method includes receiving a plurality of work items at the processor. The method also includes storing each of the plurality of work items in one of a plurality of queues based on a state of each work item in the workflow. The method also includes calculating queue priority factors for each of the plurality of queues at the processor. The method also includes weighting each of the queue priority factors for each of the plurality of queues to determine a retrieval priority at the processor. The method also includes retrieving at least one work item from each of the plurality of queues according to the retrieval priority for storage in a workflow data structure. The method also includes processing the work items stored in the workflow data structure at an initial number of processing modules. The method also includes retrieving threshold load level data from a memory. The method also includes monitoring an actual processing load required to process the work items. The method also includes comparing the actual processing load to the threshold load level data. The method further includes increasing the initial number of processing modules to a higher number of processing modules when the actual processing load is greater than the threshold load level data. The method further includes decreasing the initial number of processing modules to a lower number of processing modules when the actual processing load is less than the threshold load level data.

DETAILED DESCRIPTION

Aspects of the workflow management system (WMS) described herein provide the ability to adjust an amount of available processing capacity when processing work items in a workflow via multiple processing threads ("processing modules.") For example, the WMS adjusts the number of processing modules, used by a processing device, such as a server, when processing work items in the workflow. By monitoring a load of each of the processing modules and comparing the load of each processing module to a predetermined threshold load, the WMS can dynamically adjust the number of processing modules available to retrieve and process work items based on the comparison. For example, the WMS activates one or more processing modules when the processing load exceeds a predetermined maximum level. As another example, the WMS deactivates one or more processing modules when the processing load falls below a predetermined minimum level. As used herein, the terms "processing load" not only refers to the amount of work items being processed, but can also refer to the amount of time required to process a given work item.

Other aspects of the WMS provide the ability to improve equity when processing work items stored in multiple queues. For example, it is important to ensure that a queue storing a large number of work items is not monopolizing processing time to the detriment of another queue with a low number of work items. As described in the example above, queue A may include 100,000 work items and queue B may include 2,500 work items. If all of the work items in queue A are processed before any of the work items in queue B are processed, the completion of actions associated with the work items in queue B may be significantly delayed, and, thus the associated business process can lose valuable processing time. To combat this issue, the WMS assigns a retrieval priority to each of the multiple queues based on various factors and then retrieves at least one or more items from each queue in a sequence based on the assigned retrieval priorities. The WMS stores the retrieved items in a data structure according to the sequence and the multiple processing modules retrieve items from the data structure for processing according to the sequence.

In a workflow, a work item is moved from one state to another state according to a particular modeled business process. Movement of the work item from a particular state occurs when a task or an action is applied to that work item. For example, an action is applied to the work item at a first state to move that work item to a second state. Another action is applied to the work item at the second state to move the work item to a third state. This process continues until the workflow is complete.

An example of a business process that can be modeled by a workflow is the process of hiring employees for a business. When it is determined that a business has an opening for a job, that business will receive and review information from applicants interested in the job. In this example, the work items are application documents including job applications, cover letters, resumes, and certifications that correspond to an applicant. When an application document is received from an applicant, that document is in an input state and is entered into the system through an input queue. The input queue has an automated response action, which sends an email to the applicant to acknowledge receipt of the applicant's document. After the acknowledgement is sent, the document is in a verification state and is routed to a verification queue. The action that occurs to the document at the verification queue is, for example, indexing by a human resource representative. For example, the document is matched to the job the applicant applied for and a project is created that contains all documents for the applicant related to that job. If there is already a project for this applicant, the document gets added to the existing project. The human resource representative fills in department attributes of the project, such as job title and department name, along with name and contact information of the applicant. The human resource representative then routes the project to an automated recruiter dispatch queue, which corresponds to a dispatch state.

The recruiter dispatch queue dispatches projects to various recruiters at various departments based on project attributes. Each recruiter monitors a separate workflow queue. The automated dispatch queue verifies that the necessary fields are populated, and routes the documents to the proper recruiter's workflow queue. If any of the required fields are missing, the project is routed to an exception queue for the appropriate action to be taken.

The recruiter that receives projects directly from that automated dispatch queue is, for example, a Level 1 recruiter that conducts an initial phone interview with the applicant. For example, the Level 1 recruiter views documents in a project included in a their workflow queue, performs a phone interview, and fills in the necessary attributes on the project that relate to the applicant and position during or after the phone call.

If applicant is suitable, the project is routed to an eligibility queue. The eligibility queue may interact with an external component to assure the employment eligibility requirements are met, such as eligibility to work in United States. If the position requires security clearance, a security check request is submitted, and project gets routed to a "waiting eligibility" queue. Items in the waiting eligibility queue wait for the eligibility checks to complete, such as governmental forms.

When the requested forms arrive, the project documents either get routed to appropriate Level 2 recruiter's queue or to rejection queue. The rejection queue, for example, prepares a rejection letter to send to the applicant. The Level 2 recruiter reviews documents included in a project in the Level 2 recruiter's queue for a particular applicant and schedules an onsite interview for that particular applicant.

Another example of a business process that can be modeled by a workflow is the process of managing accounts payable associated with a construction project. For example, after a shipment of lumber is received at a construction job site, a construction superintendent, or another responsible party, receives an invoice specifying a cost for the lumber. For example, the invoice may specify an dollar amount due of $2,000.00. A construction superintendent creates an electronic version of the invoice by, for example, scanning the paper invoice via a scanner. The scanned invoice becomes a workflow item. After the invoice is scanned, the invoice is in a prescreening state and is placed into an accounts payable (AP) prescreening queue. The action that occurs to work items in the prescreening queue is, for example, a visual inspection of the scanned document to verify that all fields are legible.

If any field of the scanned invoice requires correction, the invoice is routed to a fax back queue. The action that occurs to work items in the fax back queue is, for example, sending invoices back to the superintendent via a facsimile machine for correction. If the scanned invoice passes the visual inspection, the invoice is in a Level 1 approval state and is routed to a Level 1 approvers queue. The action that occurs to work items in the Level 1 approvers queue is approving the invoice for payment by accounting personnel or other users with level 1 authority. Depending on the payment amount required by the invoice, the work item may need to be routed to a next level approver queue, such as a Level 2 approvers queue. Level 2 approvers can approve items in the Level 2 approvers queue. Each approver approves the invoice for payment by, for example, adding an approval stamp, electronic signature, or any other approval indication to the invoice.

As described in more detail below, inbound actions, within queue actions, and outbound actions are also associated with queues. For example, consider the workflow is the modeled process of managing accounts payable for a business. In this example, an in bound action to the Level 1 approver queue may include matching the invoice with a corresponding purchase order. If no matching purchase order is found, an approver can manually enter item metadata, for example. In Level 1 approver and Level 2 approver queues, within queue actions include monitoring the work items for the existence of the required stamps and outbound actions may include verifying the next step by looking at the invoice amount. Invoices approved for payment are routed to an Account Payable end queue and are filed. If any exception occurs during the workflow process, the work items are routed to an Account Payable exception queue for the appropriate action to be taken.

Figure 1A:
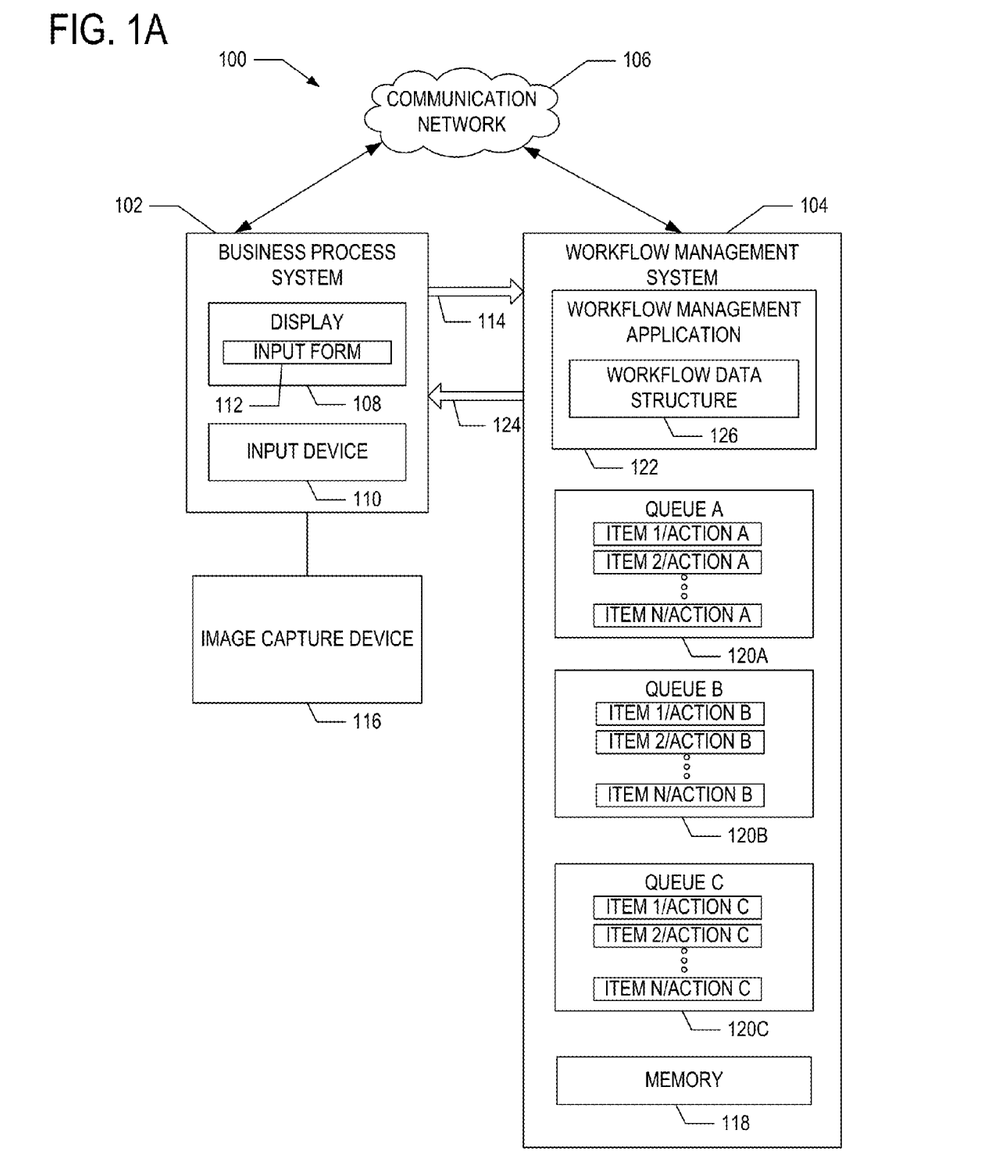
FIG. 1A is a block diagram of a workflow management system according to one aspect of the invention.

FIG. 1A is a block diagram of an exemplary operating environment 100 for managing a workflow according to an aspect of the present invention. The operating environment 100 includes a business processing system 102 that communicates with a WMS 104 over a communication network 106 using an appropriate communication protocol. The communication network 106 can be the Internet, an intranet, or another communication network. For example, the business processing system 102 and the WMS 104 communicate data using a Hyper Text Transfer Protocol ("HTTP") or any other communication protocol.

According to one aspect, the business processing system 102 is a computing or processing device, such as a personal computer station or a server computer. The business processing system 102 may include a display 108, such as a computer monitor, for viewing data or input forms, and an input device 110, such as a keyboard or a pointing device (e.g., a mouse, trackball, pen, touch pad, or other device), for interacting with data and/fields displayed on an input form 112. The input form 112 may be stored locally on the business processing system 102 or retrieved from the WMS 104.

Figure 2A:
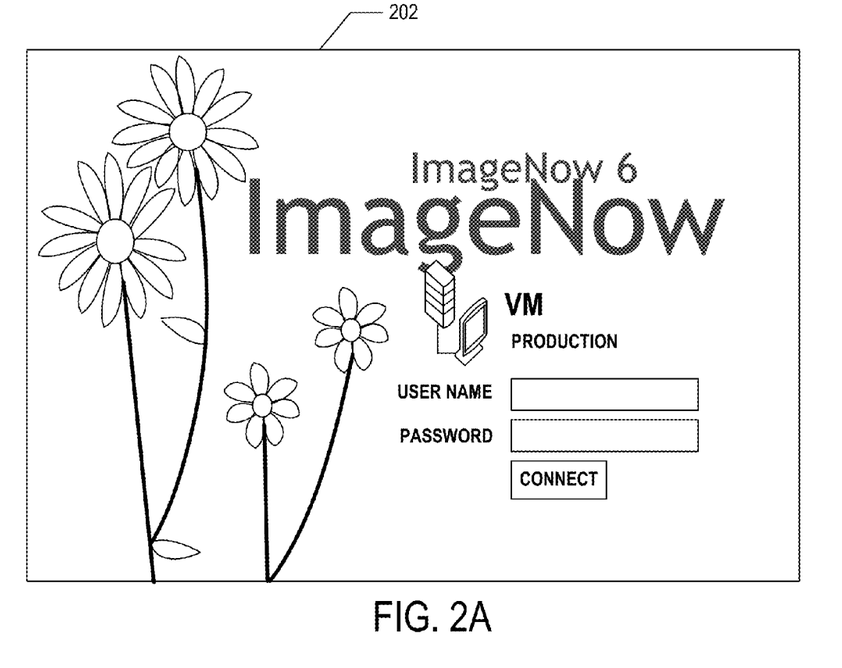
FIGS. 2A and 2B are examples of input forms.
Figure 2B:
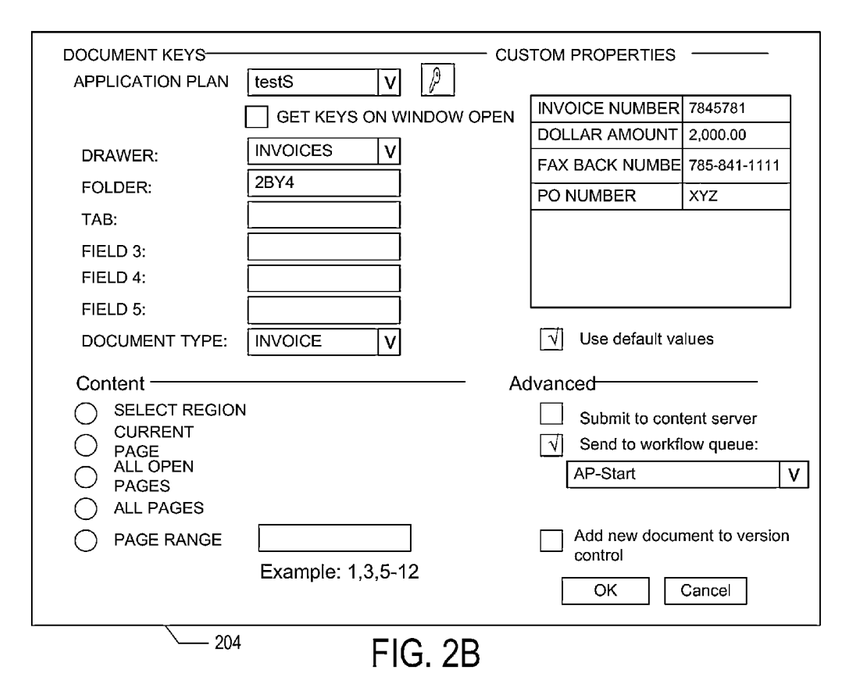

According to one aspect, a user uses the input device 110 to manually input the business process type and/or work item data via the input form 112. For example, the user uses the keyboard to interact with an input form 112, such as a login workflow request form 202 shown in FIG. 2A, to enter authentication data to access a desired workflow modeled by the WMS 104. Authentication data includes, for example, a user name and password. The user can also use the keyboard to interact with another input form 112, such as a workflow data entry form 204 shown in FIG. 2B, to enter work item data. Entered work item data may include information about the work item to be processed in the workflow and/or a desired queue to send work item data. For example, as shown in FIG. 2B, work item data may be associated with the payment of an invoice associated with an account and may include a payment amount, an invoice number, a fax back number, a purchase order number, and any other type of work item data.

Referring back to FIG. 1A, the business process system 102 generates a workflow request, as indicated by reference character 114 in response to the user input. The workflow request 114, which includes the identified workflow, a work item, work item data, and authentication data, is transmitted to the WMS 104 via the communication network 106.

According to another aspect, an image capture device 116, such as a scanner or a fax machine, captures an image of a document that includes work item data. For example, the image capture device 116 captures an image of an invoice to be submitted to the business processing system 102. The image capture device 116 transfers the captured image to the business processing system 102. The business processing system 102 executes, for example, imaging software (not shown) that processes the captured image to identify work item data. The business processing system 102 may also process the captured image to identify codes, such as barcodes or other identifiers in the captured image, to identify a particular workflow associated with that particular document. The business processing system 102 generates the workflow request 114 in response to the identified work item data and business process.

Figure 1B:
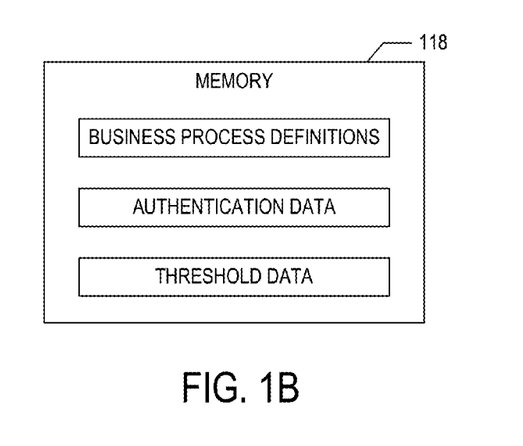
FIG. 1B is a block diagram of a memory storing data according to one aspect of a workflow management system.

The WMS 104 is, for example, a personal computer, a server computer, or any other computing device that can receive and process the workflow request 114. The WMS 104 processes the workflow request 114 to identify a desired workflow associated with the identified business process. According to one aspect, the WMS 104 retrieves a business process definition from a memory 118 that corresponds to the identified business process included in the workflow request 114. FIG. 1B depicts exemplary contents of the memory 118.

The business process definition included in the memory 118 identifies the various states of work items in the workflow associated with the identified business process. The various states within the identified business process correspond to various queues, such as queues 120A-120C. Each of the queues 120A-120C store work items at a different one of the various states within the identified business process. Although the WMS 104 is depicted as including three queues 120A-120C, it is contemplated that the WMS 104 may include fewer or more queues. Also, although the queues 120A-120C are depicted as being located on the WMS 104, it is contemplated that each of queues 120A-120C can be located on one or more separate computing devices that are linked to the WMS 104.

Figure 3:
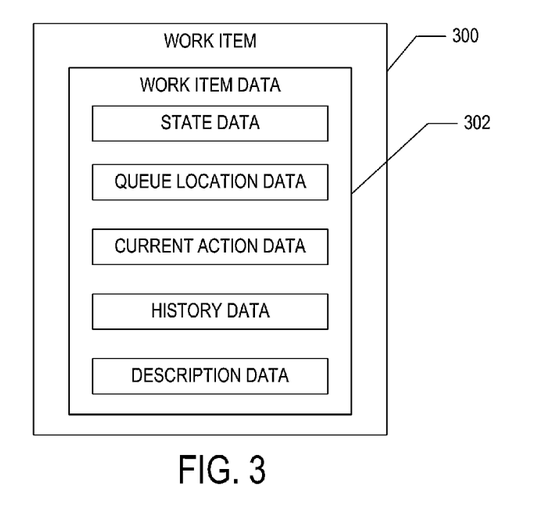
FIG. 3 is a block diagram depicting examples of work item data associated with a work item.

FIG. 3 depicts an exemplary work item 300 that includes various types of work item data 302. For example, work item data may include state data, queue location data, current action data, history data, and description data for a particular work item. State data indicates the state of work item 300 in the business process. Example states could include new, pending, completed, and so forth. Queue location data identifies the queue in which the work item is located. Current action data indicates the current action to be performed on the work item to move the work item from the current state to another state. History data details a history of actions performed and corresponding times the actions were performed for the work item 300. For example, each time the work item 300 is amended or moved to a different queue, history data is updated. Description data includes a definition of the problem or body or work represented by the work item 300, and can include text and coded indicators for special instructions. It is contemplated that the work item 300 may comprise other types of work item data 302. Work item data 302 can be used to, among other things, to determine a priority for retrieving work items from each of the queues 120A-120C.

Referring back to FIG. 1A, according to one aspect, the WMS 104 includes an authentication service that verifies whether the business processing system 102 is authorized to submit the workflow request 114 to the WMS 104 for processing. For example, the WMS compares authentication data, such as user identification (ID) and password, entered into the workflow request form 200 to authentication data stored in the memory 118. Stored authentication data may include passwords and/or user IDs previously defined during a registration phase. If user authentication data received from the business processing system 102 does not match authentication data stored in the memory 118, the business processing system 102 is not authenticated and is denied access to WMS 104. If the user authentication data received from the business processing system 102 matches the authentication data stored in the memory 118, the business processing system 102 is authenticated and allowed to exchange data with the WMS 104.

According to another aspect, the authentication data included in a workflow request is not only used to authenticate the business processing system, but can also be used to identify the desired business process. For example, the memory 118 may store an authentication table (not shown) that includes user IDs, passwords, and corresponding business processes.

Although the WMS 104 is illustrated as a single computing device, it is contemplated that the WMS 104 may include multiple computing devices. For example, the WMS 104 may include a front-end computing device (not shown) and a back-end computing device (not-shown.). The front-end computing device may provide the authentication service that determines whether the business processing system is authorized to submit the workflow request to the back-end computing device for processing.

According to another aspect (not shown), the WMS 104 receives work items from multiple business processing systems 102 that are each associated with a different business process and are connected to the WMS 104. In other words, the WMS 104 can process multiple workflow requests 114 received from multiple business processing systems 102.

According to another aspect, WMS 104 executes one or more software modules or software instructions, to manage the processing of work items stored in the queues 120A-120C. For example, the WMS 104 executes a workflow management application "workflow application" 122 to manage the order and timing at which work items are processed through the identified workflow. Although the workflow application 122 is depicted as including the workflow data structure 126, it is contemplated that the workflow data structure 126 can be located on one or more separate computing devices that are linked to the WMS 104.

According to one aspect, the workflow management application 122 adds a particular work item received from business processing system 102 into a particular one of the process queues 120A-120C based on a particular action associated with that work item. The action associated with the item is inherent to the current state of that item. For example, work items stored in the process queue 120A may be associated with prescreening scanned invoices, work items stored in the process queue 120B may be scanned invoices that have passed visual inspection, work items stored in the process queue 120C may be associated with invoices that require payment by a specific person or persons (e.g., level 2 approver) based on total dollar amount of the invoice. These are examples of "processing actions." Processing actions can also facilitate scripting actions, archiving actions, and routing actions.

Scripting actions cause the workflow application 122 to perform a particular action or actions on a work item within the business process. Scripting actions can be defined in a script file that comprises programmatic instructions in a scripting language, such as Iscrip, Visual scripting language (VSL), or any other compatible scripting language. For example, a script file may include instructions for interfacing the workflow application 122 with an automated processing device used during the workflow. This allows the workflow application 122 to communicate with an automated process, such as an automated or computer controlled machine that generates checks for payment for work items stored in process queue 120B. For example, the workflow application 122 generates a control message, as indicated by reference character 124, that includes instructions to control and/or interface with an automated process associated with the business processing system 102. The control message 124 may also include instructions for the user of the business processing system to perform a particular task or action, such as data entry.

Other scripting actions may include rotating, scaling, and resizing captured images. For example, the workflow request 114 received from the business process system 102 may include captured image data of an invoice The workflow management application 122 is configured to rotate, scale, or resize the captured image in order to obtain the required work item data. It is contemplated that the business process system 102 can also be configured to rotate, scale, and resize captured images.

Archiving actions include instructions for storing or updating work item data associated with a work item. For example, archiving actions may store or update work item data, such as the state of the work item, a time an action associated with a particular state occurs, a duration the work item remained at a particular state, or any other data associated with the work item. Archiving instructions may also include instructions for adding a record to inactive table (not shown) stored in the memory 118. The inactive table stores, for example, work items that have completed the business process.

Routing actions include instructions for routing a work item to a new queue. For example, routing actions may include instructions for routing work item data to a next queue in the business process based on the business process definition retrieved from the memory 118. Routing actions may also include instructions for delaying the application of an action for a predetermined period of time that would result in the routing of a work item from one queue to the next queue or completion of the workflow.

Processing actions can be an in-bound action, a within queue action, and/or an outbound action. An in-bound action is action that occurs to the work item as it is placed into a particular queue. For example, an in-bound action associated with the managing an accounts payable processing action may involve adding a stamp, such as a metadata stamp to the work item. The stamp describes the processing action that is to be performed to the work item at that particular queue. For example, if the processing action is to be manually performed by a user of the business processing system 102, the stamp may specify instructions/guidelines for the user when authorizing payment of an invoice. Such instructions may include contacting the construction superintendent to verify the construction materials identified in the invoice were delivered before authorizing payment.

A within queue action is the processing action (e.g., Actions A-C in FIG. 1A) associated with particular queue in which the work item is located. For example, when an application document, such as a resume is received at a business with a job opening, the application document is in a data entry or input state. Within queue processing action that occurs at the data entry state is, for example, the entry of applicant information, such as applicant's name, education level, position applied for, and any other information relevant to the job opening.

An out-bound action is an action that occurs to a work item as it is leaving the particular queue or transitioning from one state to another state. For example, an out-bound action associated with managing accounts payable associated with a construction project verifying that the next step in the payroll process. As described above, the out-bound action may involve verifying the next step in the payroll process by looking at the invoice amount.

According to another aspect, the workflow management application 122 identifies a next one of the queues 120A-120C from which one or more work items should be retrieved for storage in a workflow data structure 126. For example, the workflow management application 122 analyzes the work item data, such as described above in reference to FIG. 3, that is associated with each work item stored in each of the queues 120A-120C to identify a particular one of the queues 120A-120C from which work items will be retrieved for storage in the workflow data structure 126.

Figure 4:
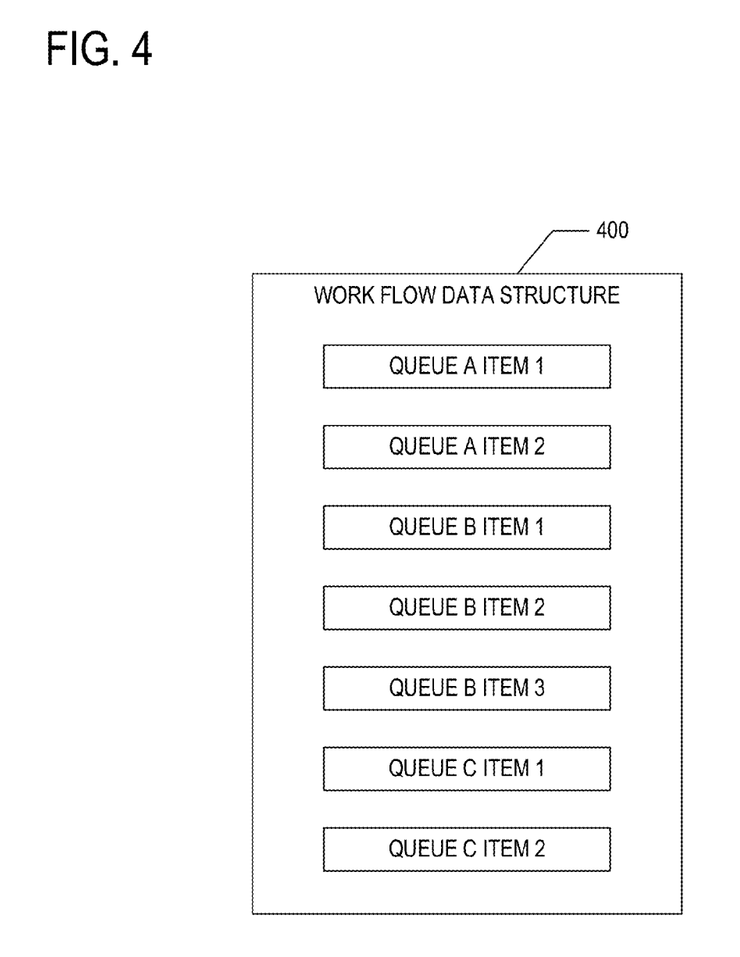
FIG. 4 is a block diagram of a workflow data structure according to one aspect of a workflow management system.

FIG. 4 depicts an exemplary workflow data structure 400 for storing work items and corresponding actions retrieved from the queues 120A-120C. According to one aspect, the workflow data structure 400 stores re-queued work items. For example, the workflow data structure 400 comprises item 1 and item 2 from queue 120A, item 1, item 2, and item 3 from queue 120B, and item 1 and item 2 from queue 120C. The action to be applied to a particular re-queued work item can be determined from work item data associated with that particular re-queued work item. As described above in reference to FIG. 3, each work item comprises work item data that indicates the current action to apply to that work item. The current action can be a process action, an in-bound action, or an outbound action.

Referring back to FIG. 1A, according to another aspect, the workflow management application 122 retrieves queue data from each of the queues 120A-120C to identify a sequence or priority for accessing the queues 120A-120C to retrieve work items for storage in the workflow data structure 126. Queue data can include item count, action cost, latent time, user input, action time, last action time, and any other criteria that can be used for prioritizing queue selection. The item count is the number of work items currently stored in a queue. For example, if there are 200 work items stored in queue 120A, the item count for that queue is 200. Action cost refers to the processing load required to perform the processing action associated with that queue. Latent time is the processing time required to complete the particular action associated with that queue. User input is, for example, user preference data that indicates that user has assigned priority to the work items associated with that queue. Last action is, for example, a time that work items were last retrieved from the queue. It is contemplated that other types of queue data can be used to identify a priority for accessing the queues 120A-120C.

Figure 5:
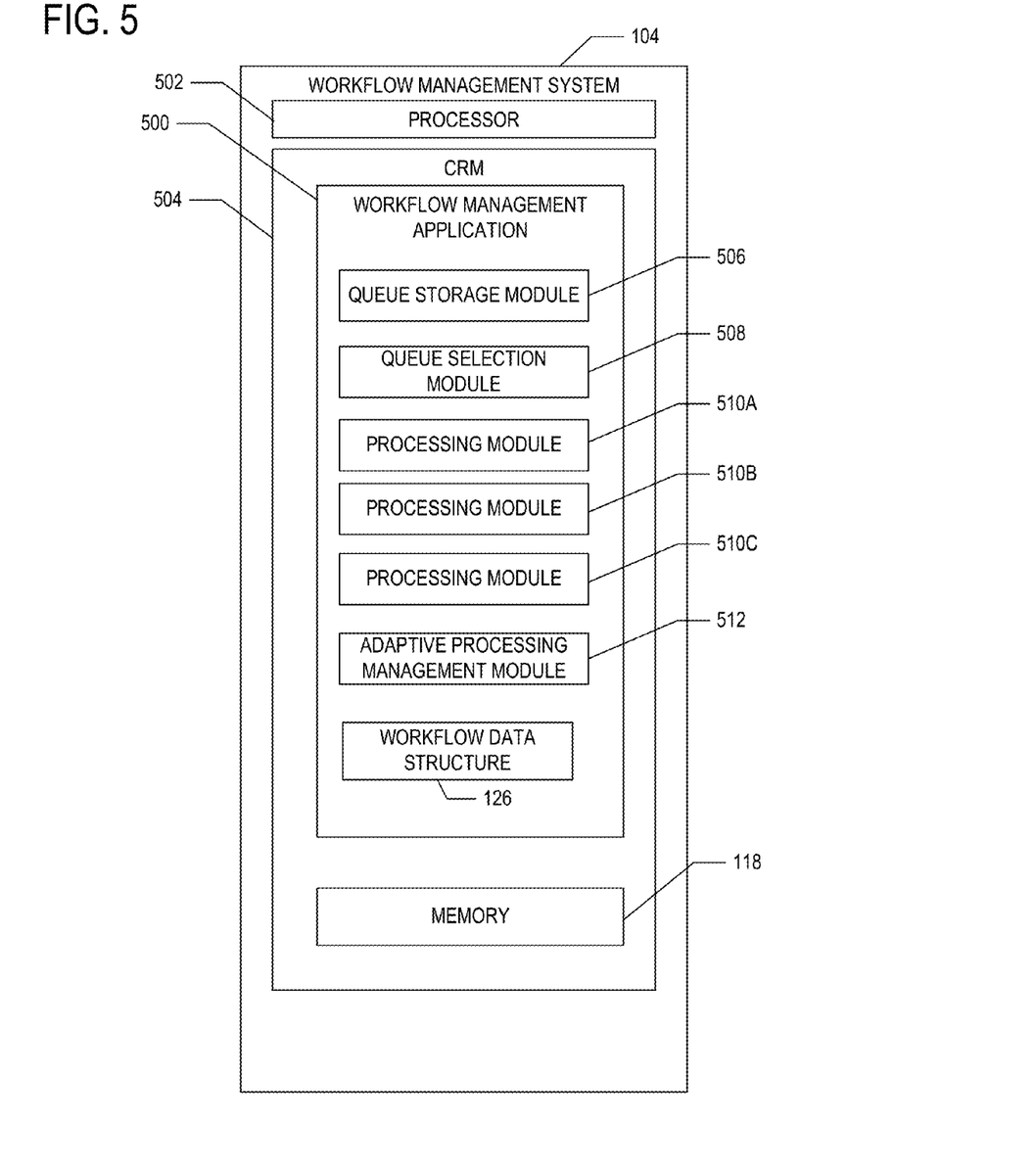
FIG. 5 is a block diagram of workflow management application according to one aspect of a workflow management system.

FIG. 5 illustrates an exemplary workflow management application (WMA) 500 according to one aspect of the WMS 104. The WMA 500 includes instructions or modules that are executable by a processor 502 of the WMS 104 to manage the processing of work items received from one or more business processing system 102. The WMS 104 includes a computer readable medium 504 configured with the WMA 500.

Computer readable media 504, which include volatile media, nonvolatile media, removable media, and non-removable media, may be any available medium that may be accessed by the WMS 104. By way of example and not limitation, computer readable media 504 comprise computer storage media and communication media. Computer storage media include volatile media, nonvolatile media, removable media, and non-removable media implemented in any method or technology for storage of information, such as computer readable instructions, data structures, program modules, or other data. Communication media typically embody computer readable instructions, data structures, program modules, or other data in a modulated data signal, such as a carrier wave or other transport mechanism, and include any information delivery media.

A queue storage module 506 receives the work request 114 from the business processing system 102. As described above, the work request 114 identifies a desired business process and at least one work item. The queue storage module 506 retrieves the business process definition from the memory 118 that corresponds to the identified business process to identify the various states in the workflow. The queue storage module 506 then transmits at least one work item to queues 120A, 120B, or 120C based on the state of the at least one work item. For example, in the managing accounts payable described above, the queue storage module 506 stores work items that require a visual inspection into queue 120A, stores work items invoice that pass the visual inspection in queue 120B, and stores work items need to be routed to a next level approver based on payment amount queue in queue 120C.

A queue selection module 508 selects a next one of the queues 120A-120C from which to retrieve work items for processing and transfers one or more work items from the selected one of the queues 120A-120C to the workflow data structure 126. According to one aspect, the queue selection module 508 calculates queue priority factors associated with each of the queues 120A-120C to determine which one of the queues to select for work item retrieval. The calculated queue priority factors for each queue include, for example, number of work items in the queue, average processing time for the action associated with the queue, length of time oldest item has been in the queue, action type, and frequency at which queue has been visited. According to one aspect, calculating the queue priority factors involves retrieving queue data associated with each of the queues 120A-120C. It is contemplated that the queue priority factors may include other queue priority factors, such as queue momentum, a user defined adjustment parameter, or any other queue selection criteria.

Queue momentum refers to a ratio of the rate at which work items are being added to a particular queue to the rate at which the work items from that particular queue are being processed and/or transferred to the workflow data structure 126. According to one aspect, the calculated momentum of a particular queue is at least one of the factors considered when determining the priority for that particular queue. If the rate at which work items are added to a particular queue is much greater than the rate at which the work items from that particular queue are transferred to the workflow data structure 126 for processing, the calculated momentum is high. In contrast, if the rate at which work items are added to the particular queue is substantially the same as the rate at which they are being transferred to the workflow data structure 126 for processing, the calculated momentum is low. The higher the calculated queue momentum for a particular queue, the faster that particular queue will reach its maximum storage capacity. According to one aspect, the queue with the highest calculated queue momentum is assigned the highest priority for retrieving work items for transfer to the workflow data structure 126.

For example, consider that ten (10) work items are added to queue A during a particular period of time and that two work items are transferred from queue A for processing during that same particular period of time. Further, consider that ten (10) work items are added to queue B during the particular time period and that five (5) work items are transferred from queue B for processing during that the particular time period. The momentum of queue A can be expressed as 10/2 or 5. The momentum of queue B can be expressed as 10/5 or 2. In this example, queue A would be assigned a higher priority than the priority assigned to queue B.

According to another aspect, the queue selection module 508 employs an algorithm that applies a weighting factor to each selection criterion when selecting a particular next one of the queues 120A-120C from which to retrieve work items. For example, using the five queue priority factors in the example above, the algorithm may weight the average processing time for the associated action and the length of time the oldest item has been in the queue more heavily than the number of work items in the queue.

As another example, the queue selection module 508 employs an algorithm that determines the number of work items to retrieve from each of the queues 120A-120C based on an amount of time historically required to process items from in each queue. Although each queue may be allocated the same amount of processing time, the amount of work items pulled from each queue may be different.

The amount of time required to process all work items, D, can be calculated by the following equation:

$$D = \sum_{n=1}^{N} (i_n * c_n) \qquad (1)$$

where, $i_n$ denotes the average duration required to complete the processing action for work items in work queue n, and $c_n$ is the number of work items in work queue n, and N is the number of work queues in the system.

The number of work items, $P_a$, to be pulled from a particular work queue, such as "work queue A," can be calculated by the following equation:

$$P_a = \frac{D/N}{i_a} \qquad (2)$$

were $i_a$ is the average time required historically to process work item i in work queue A.

An adjusted pull amount, $P'_a$, is calculated using the following equation:

$$P'_a = \left(1 + \frac{k}{100}\right) * P_a \qquad (3)$$

where k is a pull amount adjustment parameter. The pull amount adjustment variable, k, is an integer between 1 and 100 that is defined by an authorized user. For example, a system administrator uses an administrative input device (not shown) to interact with the WMS 104 to define the pull amount adjustment parameter via, for example, a system settings input form (not shown). From equation 3, it can be seen that the calculated $P'_a$ can range from $1.01*P_a$ to $2*P_a$.

The adjusted pull amount, $P'_a$, identifies the number of work items to retrieve from work queue A for insertion into the workflow data structure 126. Processing modules, such as processing modules 510A-510C, each retrieve work items from the workflow data structure for processing. The processing modules 510A-510C also update duration statistics for completing process actions. According to another aspect, the calculated adjusted pull amount $P'_a$ is also used to indicate the retrieval priority of the work queue A. For example, the queue with the highest adjusted pull amount value will be assigned the highest priority.

According to another aspect, the number of work items to be pulled from each work queue is adjusted or modified based on a predetermined maximum number, m, of work items. The predetermined maximum number, m, defines the maximum number of work items to be processed at a time. A modified adjusted pull amount, $p_a$, is determined using the following equation.

$$p_a = P'_a * (m/\max(P'_x)); \qquad (4)$$

where $P'_x$ is a list of the calculated adjusted pull amount values for the work queues in the system. For example, if there are three work queues in the system, $P'_x$ is a list of the three calculated adjusted pull amount values for the three work queues. The $\max(P'_x)$ corresponds to the maximum calculated adjusted pull amount in the list of adjusted pull amount values, According to another aspect, the queue selection module 508 employs an algorithm that considers each of the queue priority factors equally when selecting a next one of the queues 120A-120C from which to retrieve work items. For example, if the algorithm uses five (5) different types of selection criteria, each selection criterion may contribute ⅕ to determining the next queue. In other words, each of queue priority factors is weighted equally.

The WMA 500 includes multiple processing modules to retrieve work items from the workflow data structure 126 and to execute the associated action. For purposes of illustration, the WMA 500 is depicted as including three processing modules 510A, 510B, and 510C. However, it is contemplated that the WMA 500 may include less than or more than three processing modules. Also, although the processing modules 510A-510C are depicted as being located on the WMS 104, it is contemplated that each of the processing modules 510A-510C can be executed on one or more separate computing devices that are linked to the WMS 104.

According to one aspect, processing modules 510A, 510B, and 510C retrieve work items from the workflow data structure 126 according to the order in which they were stored and execute the associated action. For example, the workflow management application 122 retrieves work items from the workflow data structure 126 according to first in first out (FIFO) rules. Although the workflow management application 122 is described as performing process actions associated with the work items according to first-in-first-out (FIFO) rules, it is contemplated that in other aspects the workflow management application 122 enables performing multiple process actions associated with the multiple work items simultaneously.

As an example, processing module 510A retrieves the first item (e.g., labeled queue A item 1) stored in the workflow data structure 126 and performs the associated action (e.g., Action A) on the work item. While processing module 510A is processing the first work item, the processing module 510B retrieves the next item (e.g., labeled queue A item 3) that was stored in the workflow data structure and performs the associated action on the next work item. As a result, the processing modules 510A and 510B not only enable processing multiple work items simultaneously, the processing modules 510A-510B also enable processing items from different queues simultaneously.

According to another aspect, processing modules 510A, 510B, and 510C retrieve work items from the workflow data structure 126 according to other non-FIFO rules. That is, the order in which work items were added to the data structure 126 is not relevant for purposes of determining the order in which processing modules 510A, 510B, and 510C retrieve work items from the workflow data structure 126 for processing. For example, the processing modules 510A, 510B, and 510C may retrieve work items from the workflow data structure 126 based on queue data and/or work item data associated with each work item.

An adaptive processing module 512 monitors the load on the processing modules 510A-510C and selectively activates additional processing modules or deactivates processing modules based on the load experienced by one or both of processing modules. For purposes of illustration, consider that the processing modules 510A and 510B are currently activated. During operation, the adaptive processing module 512 senses the processing load of each of processing modules 510A and 510B and compares the sensed processing load to maximum and minimum threshold load level values stored in the memory 118 to determine whether to activate an additional processing module or to deactivate a currently active processing module.

According to one aspect, the adaptive processing module 512 determines whether to activate an additional processing module 510C by comparing the actual processing load of the processing modules 510A and 510B to their respective maximum processing capacities to determine a percent of operating capacity for each of the processing modules 510A and 510B. If the actual processing loads of either the current processing modules 510A or 510B exceeds a maximum threshold percentage, the adaptive processing module 414 activates an additional processing module (e.g. processing module 510C) to retrieve and process work items from the workflow data structure 126. For example, if the load experienced by processing modules 510A or 510B exceeds 90% percent of maximum processing capacity, the adaptive processing module 512 activates processing module 510C.

According to another aspect, the adaptive processing module 512 monitors the load on the processing modules 510A-510C and selectively deactivates one of the processing modules 510A-510C when the load experienced by one or more of processing modules falls below a minimum processing threshold percentage. For example, if the load experienced by processing module 510A falls below twenty-five (25) percent of processing capacity, the adaptive processing module 512 deactivates processing module 510A.

Figure 6:
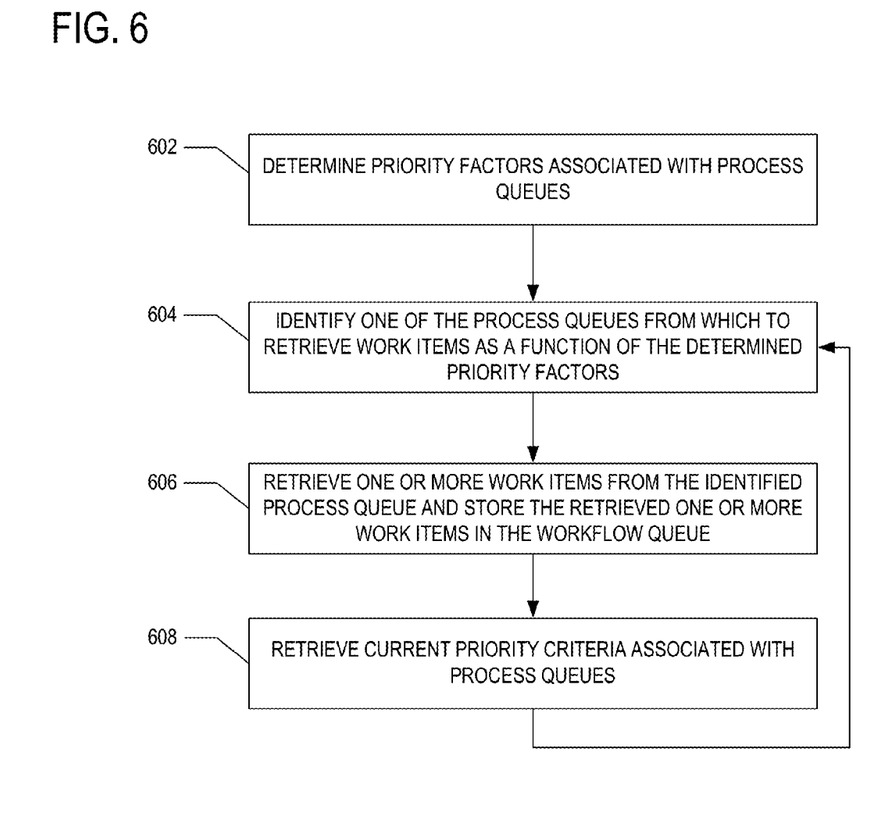
FIG. 6 illustrates a method for populating a workflow data structure in accordance with an aspect of a workflow management system.

FIG. 6 illustrates a method for populating the workflow data structure 126 in accordance with an aspect of the WMA 500. At 602, the WMA 500 determines priority factors associated with a plurality of process queues 120A-120C. Priority factors can include work item data associated with work items in the plurality of process queues 120A-120C and/or queue data. The WMA 500 identifies one of the process queues 120A-120C from which to retrieve work items for storage in a central workflow data structure as a function of the queue priority factors at 604. For example, the WMA 500 employs an algorithm that uses the retrieved priority criteria and/or work item data to identify one of the process queues 120A-120C from which to retrieve work items. At 606, the WMA 500 retrieves one or more work items from the identified one of the process queues 120A-120C and stores the retrieved one or more work items in the workflow data structure 126.

According to one aspect, the WMA 500 retrieves a predetermined number of work items from the identified process queue for storage in the central workflow data structure 126. For example, the WMA 500 may be configured to retrieve up to a maximum of 10 work items from the identified queue.

According to another aspect, the number of work items retrieved by the WMA 500 from the identified process queue is determined by employing a weighting algorithm such as described above.

At 608, WMA 500 retrieves new priority criteria associated with each of the process queues 120A-120C. The WMA 500 uses the new priority criteria retrieved at 508 to identify which one of the process queues 120A-120C from which to retrieve work items for storage in a central workflow data structure 126 as a function of the retrieved priority criteria at 604.

Figure 7:
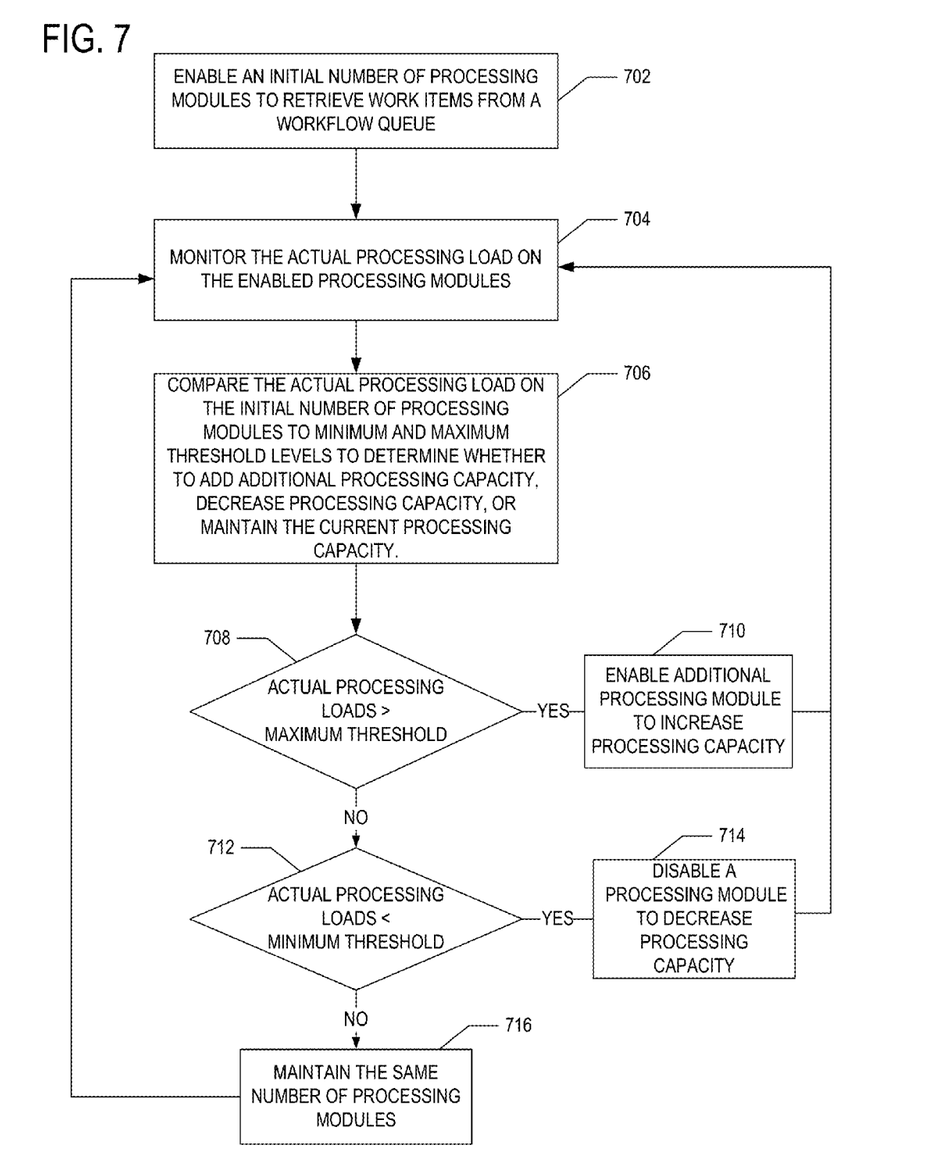
FIG. 7 illustrates a method for managing processing capacity in accordance with an aspect of a workflow management system.

FIG. 7 illustrates a method for managing processing capacity in accordance with an aspect of the WMA 500. At 702, an initial or current number of processing modules (e.g., 510A and 510B) are enabled and retrieve work items from the workflow data structure according to first in first out (FIFO) rules. The WMA 500 monitors the actual processing load on the current number of processing modules at 704. At 706, WMA 500 compares the actual processing load on the current number of processing modules to minimum and maximum threshold levels retrieved from a memory to determine whether to add additional processing capacity, decrease processing capacity, or maintain the current processing capacity.

If the load experienced by the current processing modules 510A or 510B exceeds the maximum threshold level at 708, the WMA 500 activates an additional processing module (e.g. processing module 510C) to retrieve and process work items from the central workflow data structure at 710. If the load experienced by the current processing modules 510A and 510B does not exceed the maximum threshold level at 708, the WMA 500 determines if the load experienced by at least one of the current processing modules 510A and 510B falls below the minimum threshold percent level at 712. If the load experienced by at least one of the current processing modules 510A and 510B falls below the minimum threshold percent level at 712, WMA 500 deactivates that at least one of the processing modules 510A and 510B at 614. If the load experienced by at least one of the current processing modules 510A and 510B does not fall below the minimum threshold percent level at 712, the WMA 500 may maintain the current processing capacity at 716. Alternatively, if the load experienced by at least one of the current processing modules 510A and 510B does not fall below the minimum threshold percent level at 712, the WMA 500 may randomly decide to adjust the processing capacity at 716 to detect otherwise unnoticed changes to the state of the system running the WMA 500.

Those skilled in the art will appreciate that variations from the specific embodiments disclosed above are contemplated by the invention. The invention should not be restricted to the above embodiments, but should be measured by the following claims.

What is claimed is:

1. A computer-readable non-transitory medium encoded with a workflow application comprising modules executable by a processor and configured to process a plurality of work items in a workflow, the workflow application comprising:
   a queue storage module to receive a plurality of work items from a remote computer and to store each of the plurality of work items in one of a plurality of queues based on a state of each work item in the workflow;
   a queue selection module to determine a retrieval priority for each of the plurality of queues and to retrieve at least one work item from each of the plurality of queues according to the retrieval priority for storage in a workflow data structure; and
   an adaptive processing module to selectively adjust a number of processing modules each configured to process work items stored in the workflow data structure by:

activating at least one processing module when an actual processing load is greater than a maximum threshold load level; and deactivating at least one processing module when the actual processing load is less than a minimum threshold load level, wherein the maximum threshold load level is ninety percent (90%) of a maximum processing capacity and the minimum threshold load level is twenty-five percent (25%) of processing capacity.

2. The computer-readable medium of claim 1 wherein each of the plurality of work items comprise work item data, and wherein the queue selection module is configured to determine the retrieval priority for each of the plurality of queues as a function of the work item data.

3. The computer-readable medium of claim 2 wherein each work item comprises work item data selected from a group consisting of state data, queue location data, current action data, history data, and description data.

4. The computer-readable medium of claim 3 wherein:
the current action data for each work item identifies a corresponding current action selected from a group consisting of an inbound action, a within queue action, and an outbound action; and
each of the number of processing modules is configured to process one or more of work items stored in the workflow data structure by applying the corresponding current action to each of the one or more work items.

5. The computer-readable medium of claim 1 wherein the queue selection module is configured to determine the retrieval priority by:
calculating queue priority factors for each of the plurality of queues; and
weighting each of the queue priority factors for each of the plurality of queues to determine the retrieval priority.

6. The computer-readable medium of claim 5 wherein the queue priority factors for each of the plurality of queues comprises item counts, action costs, processing time data, and a last processing action time.

7. The computer-readable medium of claim 1 further comprising:
a memory comprising the minimum and the maximum threshold load levels; and
wherein the adaptive processing module is further configured to:
retrieve the minimum and maximum threshold load levels from the memory; and
monitor the actual processing load required to process the work items.

8. The computer-readable medium of claim 1 wherein:
the maximum threshold load level corresponds to a maximum allowable percentage of total processing capacity; and
the minimum threshold load level corresponds to a minimum allowable percentage of total processing capacity.

9. The computer-readable medium of claim 1 wherein the adaptive processing module is further configured to maintain a current number of processing modules to process the work items when the actual processing load is greater than the minimum threshold load level and less than the maximum threshold load level.

10. A system for processing work items in a workflow, the system comprising:
a plurality of queues each comprising a plurality of work items; and
a computing device comprising a workflow application comprising modules executable by the computing device and configured to process a plurality of work items in a workflow, the workflow application comprising:
a queue selection module to determine a retrieval priority for each of the plurality of queues and to retrieve at least one work item from each of the plurality of queues according to the retrieval priority for storage in a workflow data structure; and
an adaptive processing module to selectively adjust a number of processing modules each configured to process work items stored in the workflow data structure by:
activating at least one processing module when an actual processing load is greater than a maximum threshold load level; and
deactivating at least one processing module when the actual processing load is less than a minimum threshold load level, wherein the maximum threshold load level is ninety percent (90%) of a maximum processing capacity and the minimum threshold load level is a twenty-five percent (25%) of processing capacity.

11. The system of claim 10 wherein each of the plurality of work items comprise work item data, and wherein the queue selection module is configured to determine the retrieval priority for each of the plurality of queues as a function of the work item data.

12. The system of claim 10 wherein each work item comprises work item data selected from a group consisting of state data, queue location data, current action data, history data, and description data.

13. The system of claim 12 wherein:
the current action data for each work item identifies a corresponding current action selected from a group consisting of an inbound action, a within queue action, and an outbound action; and
each of the number of processing modules is configured to process one or more of work items stored in the workflow data structure by applying the corresponding current action to each of the one or more work items.

14. The system of claim 10 wherein the queue selection module is configured to determine the retrieval priority by:
calculating queue priority factors for each of the plurality of queues; and
weighting each of the queue priority factors for each of the plurality of queues to determine the retrieval priority.

15. The system of claim 14 wherein the queue priority factors for each of the plurality of queues comprises item counts, action costs, processing time data, and a last processing action time.

16. The system of claim 10 wherein the queue selection module is further configured to:
retrieve the at least one work item from each of the plurality of queues in a sequence according to the retrieval priority;
store the at least one work item retrieved from each of the plurality of queues in the workflow data structure according to the sequence; and
process work items stored in the workflow data structure according to a first in first out rule.

17. The system of claim 10 further comprising:
a memory comprising the minimum and the maximum threshold load level; and
wherein the adaptive processing module is further configured to:
retrieve the minimum and maximum threshold load levels from the memory; and monitor the actual processing load required to process the work items.

18. The system of claim 10 wherein:
the maximum threshold load level corresponds to a maximum allowable percentage of total processing capacity; and
the minimum threshold load level corresponds to a minimum allowable percentage of total processing capacity.

19. The system of claim 10 wherein the adaptive processing module is further configured to maintain a current number of processing modules to process the work items when the actual processing load is greater than the minimum threshold load level and less than the maximum threshold load level.

20. A system for processing work items in a workflow, the system comprising:
a workflow data structure each comprising a plurality of work items; and
a computing device comprising a workflow application comprising modules executable by the computing device to process the plurality of work items, the workflow application comprising:
a plurality of processing modules each configured to process a different one of work items stored in the workflow data structure; and
an adaptive processing module to selectively adjust a number of the plurality of processing modules by:
activating at least one processing module when an actual processing load is greater than a maximum threshold load level; and
deactivating at least one processing module when the actual processing load is less than a minimum threshold load level, wherein the maximum threshold load level is ninety percent (90%) of a maximum processing capacity and the minimum threshold load level is twenty-five percent (25%) of processing capacity.

21. The system of claim 20 further comprising:
a memory comprising the minimum and the maximum threshold load level; and
wherein the adaptive processing module is further configured to:
retrieve the minimum and the maximum threshold load levels from the memory; and
monitor the actual processing load required to process the work items.

22. The system of claim 20 wherein:
the maximum threshold load level corresponds to a maximum allowable percentage of total processing capacity; and
the minimum threshold load level corresponds to a minimum allowable percentage of total processing capacity.

23. The system of claim 20 wherein the adaptive processing module is further configured to maintain a current number of processing modules to process the work items when the actual processing load is greater than the minimum threshold load level and less than the maximum threshold load level.

24. A method for processing a plurality of work items in a workflow at a processor, the method comprising:
receiving a plurality of work items at the processor;
storing each of the plurality of work items in one of a plurality of queues based on a state of each work item in the workflow;
determining a retrieval priority for each of the plurality of queues at the processor;
retrieving at least one work item from each of the plurality of queues according to the retrieval priority for storage in a workflow data structure; and selectively adjusting, by an adaptive processing module, an amount of processing capacity of the processor to process the work items stored in the workflow data structure by:
increasing the amount of processing capacity by increasing an amount of processing modules to a higher number when an actual processing load is greater than a maximum threshold load level; and
decreasing the amount of processing capacity by decreasing the amount of processing modules to a lower number when the actual processing load is less than a minimum threshold load level,
wherein the maximum threshold load level is ninety percent (90%) of a maximum processing capacity and the minimum threshold load level is twenty-five percent (25%) of processing capacity.

25. The method of claim 24 wherein each of the plurality of work items comprise work item data, and the method further comprises determining the retrieval priority for each of the plurality of queues as a function of the work item data.

26. The method of claim 25 wherein each work item comprises work item data selected from a group consisting of state data, queue location data, current action data, history data, and description data.

27. The method of claim 26 wherein:
the current action data for each work item identifies a corresponding current action selected from a group consisting of an inbound action, a within queue action, and an outbound action; and
the method further comprising processing one or more of work items stored in the workflow data structure by applying the corresponding current action to each of the one or more work items.

28. The method of claim 24 further comprising:
calculating queue priority factors for each of the plurality of queues at the processor; and
weighting each of the queue priority factors for each of the plurality of queues to determine the retrieval priority at the processor.

29. The method of claim 28 wherein the queue priority factors for each of the plurality of queues comprises item counts, action costs, processing time data, and a last processing action time.

30. The method of claim 24 further comprising:
retrieving the minimum and the maximum threshold load level from a memory at the processor; and
the method further comprises:
monitoring the actual processing load required to process the work items at the processor.

31. The method of claim 24 further comprising maintaining a current amount of processing capacity to process the work items when the actual processing load is greater than the minimum threshold load level and less than the maximum threshold load level.

32. A computer-readable non-transitory medium encoded with a workflow application comprising modules executable by a processor and configured to process a plurality of work items in a workflow, the workflow application comprising:
a queue storage module to receive a plurality of work items from a remote computer and to store each of the plurality of work items in one of a plurality of queues based on a state of each work item in the workflow;
a queue selection module to determine a retrieval priority for each of the plurality of queues and to retrieve at least one work item from each of the plurality of queues according to the retrieval priority for storage in a workflow data structure;

a set of processing modules to process the work items stored in the workflow data structure, wherein an initial number of the processing modules are used to process the work items; and an adaptive processing module to:
retrieve threshold load level data from a memory;
monitor an actual processing load required to process the work items;
compare the actual processing load to the threshold load level data;
increase the initial number of processing modules to a higher number when the actual processing load is greater than the maximum threshold load level data; and
decrease the initial number of processing modules to a lower number when the actual processing load is less than the minimum threshold load level data, wherein the maximum threshold load level data is ninety percent (90%) of a maximum processing capacity of the processing modules and the minimum threshold load level data is twenty-five percent (25%) of processing capacity of the processing modules.

33. A system for processing work items in a workflow, the system comprising:

a plurality of queues each comprising a plurality of work items; and a computing device comprising a workflow application comprising modules executable by the computing device and configured to process a plurality of work items in a workflow, the workflow application comprising:

a queue selection module to determine a retrieval priority for each of the plurality of queues and to retrieve at least one work item from each of the plurality of queues according to the retrieval priority for storage in a workflow data structure;

a set of processing modules to process the work items stored in the workflow data structure, wherein an initial number of the processing modules are used to process the work items; and an adaptive processing module to:
retrieve threshold load level data from a memory;
monitor an actual processing load required to process the work items;
compare the actual processing load to the threshold load level data;
increase the initial number of processing modules to a higher number of processing modules when the actual processing load is greater than the maximum threshold load level data; and
decrease the initial number of processing modules to a lower number of processing modules when the actual processing load is less than the minimum threshold load level data, wherein the maximum threshold load level data is ninety percent (90%) of a maximum processing capacity of the processing modules and the minimum threshold load level data is twenty-five percent (25%) of processing capacity of the processing modules.

34. A method for processing a plurality of work items in a workflow at a processor, the method comprising:

receiving a plurality of work items at the processor;
storing each of the plurality of work items in one of a plurality of queues based on a state of each work item in the workflow;
calculating queue priority factors for each of the plurality of queues at the processor;
weighting each of the queue priority factors for each of the plurality of queues to determine a retrieval priority at the processor;
retrieving at least one work item from each of the plurality of queues according to the retrieval priority for storage in a workflow data structure;
processing the work items stored in the workflow data structure at an initial number of processing modules;
retrieving threshold load level data from a memory;
monitoring an actual processing load required to process the work items;
comparing the actual processing load to the threshold load level data;
increasing, by an adaptive processing module, the initial number of processing modules to a higher number of processing modules when the actual processing load is greater than the maximum threshold load level data; and
decreasing, by the adaptive processing module, the initial number of processing modules to a lower number of processing modules when the actual processing load is less than the minimum threshold load level data, wherein the maximum threshold load level data is ninety percent (90%) of a maximum processing capacity of the processing modules and the minimum threshold load level data is twenty-five percent (25%) of processing capacity of the processing modules.

* * * * *